Feb. 20, 1940.  E. H. CHANDONIA  2,191,104
PAN STRAPPING
Filed July 29, 1938
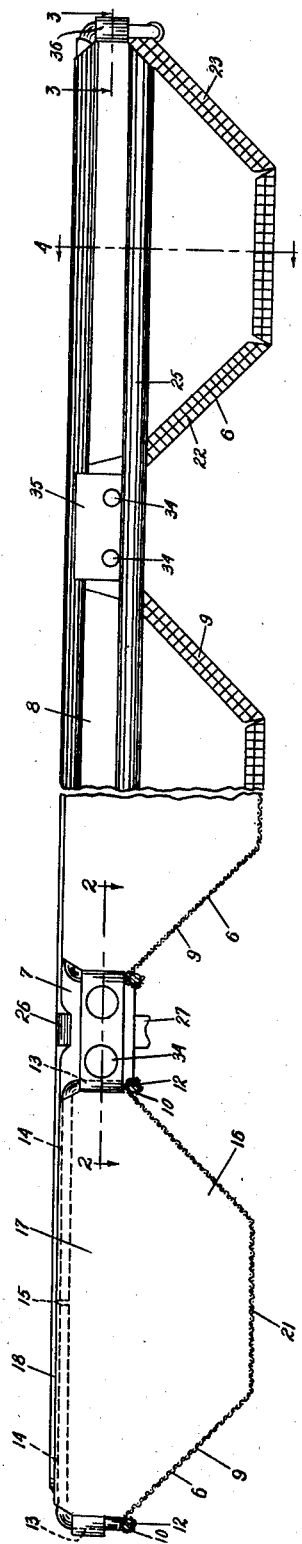
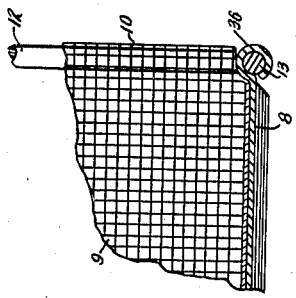
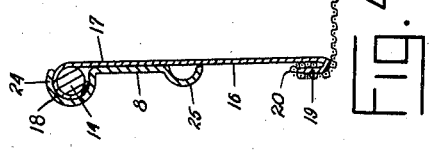
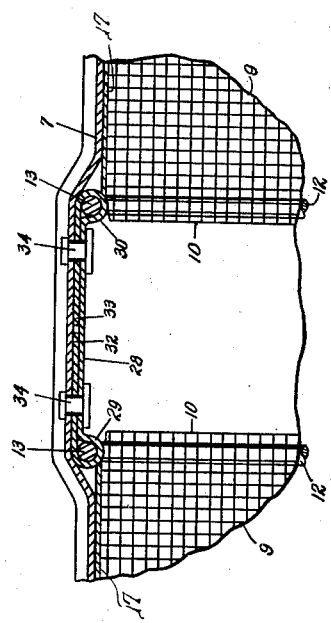
INVENTOR
Elmer H. Chandonia
BY Frank Zugelter
ATTORNEY Patented Feb. 20, 1940

2,191,104

UNITED STATES PATENT OFFICE 2,191,104

PAN STRAPPING

Elmer H. Chandonia, Amelia, Ohio, assignor to The Lockwood Manufacturing Company, Cincinnati, Ohio, a corporation of Ohio Application July 29, 1938, Serial No. 222,016

5 Claims. (Cl. 53—6)

The present invention relates to a means of strapping bake pans together in order to provide a multiple pan set, and the invention is particularly directed to such pan sets as may be employed for the baking of rye bread and like products requiring formation of extensive crust areas thereon.

An object of the invention is to provide a multiple pan structure of the character mentioned, which is durable and inexpensive to manufacture, considering the limitations and specifications that this particular type of pan set is required to meet.

Another object of the invention is to provide a pan set structure of the character stated, wherein are eliminated from the pan interiors, any and all structural elements that might mark the bakery product if such a structural element were permitted to extend into the pan interiors, or were exposed therein so as to contact the product undergoing the baking operation.

These and other objects are attained by the means described herein and disclosed in the accompanying drawing, in which:

Fig. 1 is a side elevational view of a pan set embodying the invention, approximately one half of said set being shown in cross-section along the center line of the pan set.

Fig. 2 is an enlarged fragmental cross-sectional view taken in line 2—2 of Fig. 1.

Fig. 3 is an enlarged fragmental cross-sectional view taken on line 3—3 of Fig. 1.

Fig. 4 is an enlarged cross-section taken on line 4—4 of Fig. 1.

In multiple pan sets of the character herein disclosed, which ordinarily are employed in the baking of hearth products, it is desirable that the bottoms and sides of the individual pans be constructed of mesh material, which may be of woven wires or of perforated sheet metal, as desired. Moreover, the individual pans of the set should be so constructed that the sides of the pans be constructed at a lower elevation than the pan ends, for various reasons. One important reason for so lowering the pan sides, is to facilitate the slitting of the tops of the loaves before subjecting them to the baking operation. It will be observed by inspecting any rye bread loaf or the like, that the upper face of the loaf is marked with transverse ridges or depressions indicating that the loaf had been slitted across is top surface before baking. This slitting of the loaves would be rendered difficult were the sides of the pans higher than the plastic dough mass initially placed in the pan, hence the lowering of the sides so that a knife or other slitting instrument may be drawn across all the loaves of a pan set without interference with the pan sides. The lowering of the pan sides as above related, has presented structural difficulties in manufacturing multiple pan sets wherein all the pans are supported by means of strapping applied along their ends. One of the objects of the present invention is to provide means for overcoming the difficulties of manufacturing, in the best possible manner.

With reference to the accompanying drawing, the characters 6 indicate a plurality of baking pans each of which is secured to a pair of longitudinal straps 7 and 8, serving as a means of connecting the pans together to provide a unitary structure. The bottom and sides of each pan are constructed of a single sheet of mesh material, which may be in the nature of perforated sheet metal or woven wires, such sheet being indicated by the character 9. The mesh sheet is suspended along its sides by turning the side edges 10 of the sheet about the transverse rods or wires 12 of a reinforcing frame, one of which frames is furnished for each individual pan. The frame may be of a generally rectangle shape, with the opposite ends of the rectangle turned upward to furnish riser portions 13 which project above the sides of the pan where the pan is suspended by means of the transverse rods 12 of the pan frame. As will be understood, the frame preferably is constructed of wire or rod stock of a substantial nature. At each end of the frame, the risers 13 have inwardly directed extensions 14 which meet at a location 15, and which provide suitable support for the end walls of the pans as will appear hereinafter. The frame may be made of a single length of wire or rod stock, in which event the joint at 15 will occur only at one of the two end walls of a pan.

The end wall 16 of each pan may be constituted of a substantially flat metallic sheet having an upper portion 17 extended well above the wires 12 which support the dough supporting member 9, the upper edge 18 of said end wall being turned as indicated in Fig. 4 to embrace the frame extensions 14. At the lower edge of the end plate, there is provided an upwardly turned flange 19 which forms part of a double roll seam that includes the end-most portion 20 of perforate sheet 9. Fig. 4 clearly shows how the bottom 21 of the pan is attached to the end plate 16. The sides 22 and 23 of the pan end are turned in the same manner as is indicated in Fig. 4, to furnish a roll seam including the perforate material, to form the pan sides.

By means of the construction just described, each individual pan is made into a unitary structure having a dough supporting area provided by mesh or perforate sheet 9, suspended along its sides by the transverse rods 12 of the reinforcing frame, the end plates 16 being secured by means of the double rolled seam where the end plates meet the dough supporting area to form the pan ends. It should be observed that the risers 13 are outside the limits of the pan interior, and the upper portion 17 of each pan end is located between pairs of risers, at an elevation above the transverse rods 12 and the sides of the pan. Where the upper edge 18 of an end wall curls about the frame part 14, as shown in Fig. 4, the pan connecting strap 8 may be formed with a half round strengthening rib 24 to overlie the part 18 and the rod 14 embraced thereby. To afford further strength for the pan connecting straps, they may be ribbed along their lower edge, as indicated at 25. The straps 7 and 8, moreover, may be deformed as at 26 and 27 to provide pockets and extensions, respectively, for aligning the multiple pan sets when the sets are stacked one upon another, or nested in accordance with common practice. The particular form of the elements 26 and 27 is immaterial to the instant invention. The completed individual pans comprising the bottom, side and end walls, supported by means of the wire or rod frame, may be secured in spaced relationship to one another between the straps 7 and 8, by means of connectors which may be in the form of mounting strips 28, which are best shown in Figs. 1 and 2. Each mounting strip preferably is constituted of a single length of strap metal turned upon itself to furnish a pair of eyes or loops 29 and 30, said loops being adapted to embrace the riser portions 13 of the adjacent pans. The mounting strip may have a shank portion which is substantially flat, and which is adapted to abut flatwise an adjacent portion of a pan connecting strap such as 7 or 8. The shank portion may have its free ends 32 and 33 extended toward each other so as to substantially meet, as shown in Fig. 2, although a satisfactory construction may be attained by cutting off the free ends of the strip close to the eyes or loops 29 and 30. With the mounting strip in flatwise abutment against the inner face of a pan connecting strap such as 7 of Fig. 2, rivets 34 or equivalent fasteners may be projected through the mounting strip and the pan strap, for securing the parts together. It should be noted that the pans are supported by the mounting strip, by reason of the loops or eyes of the mounting strip embracing the risers of the pan frame, at locations above the sides of the pans. That is to say, the risers and all portions of the mounting strips are disposed above and exteriorly of the pans, so that the product baked within the pan interior will not come into contact with any of these structural elements, and thereby be objectionably marked or indented upon termination of the baking treatment.

It should be observed that best construction calls for flattening of the pan connecting straps at the locations 35, where flatwise abutment thereof against the mounting clips 28 is desired.

At the ends of the multiple pan structure, the pan connecting straps 7 and 8 may be fixed to the endmost risers of the end pans, by reducing the width of the strap as at 36, and curling the reduced portion about the risers, as clearly indicated in Fig. 3; however, the particular means of attachment at the corners of the pan set is immaterial, it being possible to effect the connection by means of separate clips riveted or otherwise secured to the strap ends.

By means of the construction described, the interiors of all the pans are rendered free of structural elements such as rivet heads, clamps and the like, so that objectionable markings on the bakery products is effectually avoided. The construction is rendered additionally effective for proper baking of bread and the like, by reason of the fact that the pans receive their support from the pan connecting straps at locations exteriorly of the limits of the pans, and above the side walls thereof.

It is to be understood that the particular kind of mesh or perforate sheet material employed for forming the dough supporting area of each individual pan is immaterial to the invention and may be left to the selection of the manufacturer or the purchaser of the pan sets. Moreover, the particular type of individual pans to be included in the completed structure may be varied merely by providing longer or shorter pan connecting straps, and duplicating the manner of attaching the pans thereto, as hereinbefore explained. Various other modifications and changes in the structural details of the device may be made, within the scope of the appended claims, without departing from the spirit of the invention.

While it is presently considered that devices of the character disclosed herein should properly include mesh or perforated sheet pan constructions, there is no reason why the sheet material could not be of the ordinary unperforated or plain tinned stock so commonly used in the manufacture of bake pans, since the substitution of materials from which the pans are made does not alter the manner of assembly of the pan unit.

What is claimed is:

1. In a multiple pan structure of the character described, the combination of a plurality of pans each having a dough supporting member of suitable sheet material, and an end wall secured to said dough supporting member, said end wall extending above the dough supporting member, a reinforcing frame attached to each pan and including a riser extending upwardly along the upwardly extending portion of the end wall outside the limits of the end wall, a pan-connecting strap extending along the corresponding end walls of all the pans in close proximity to the pan frame risers, a mounting strip having opposite ends looped to embrace the risers of adjacent pans, and means fixing the mounting strip to the inner face of the pan-connecting strap.

2. In a multiple pan structure of the character described, the combination of a plurality of pans each having a dough supporting member of suitable sheet material, and an end wall secured to said dough supporting member, said end wall extending above the dough supporting member, a reinforcing frame attached to each pan and including a riser extending upwardly along the upwardly extending portion of the end wall outside the limits of the end wall, a pan-connecting strap extending along the corresponding end walls of all the pans in close proximity to the pan frame risers, a substantially flat mounting strip having ends turned upon the strip to provide loops for embracing the risers of adjacent pans, and means for securing the mounting strip flatwise upon the pan-connecting strap.

3. In a structure of the class described, the combination of a plurality of pans each having a dough supporting member of perforate sheet material, and an end wall secured to said dough supporting member with a portion of the end wall elevated substantially above it a reinforcing frame including spaced parallel sides supporting opposite sides of the dough supporting member, and including upright riser portions at the ends of the frame sides rising to an elevation well above the frame sides, extensions at the upper ends of the risers and disposed in alignment parallel to the pan end walls, said wall being turned along an edge thereof to embrace the extensions, a pan-connecting strap extended along the corresponding end walls of adjacent pans, and a mounting strip having a flat shank portion in flatwise fixed relationship to the pan-connecting strap, and means on the mounting strip for engaging and supporting a riser of a pan frame.

4. In a multiple pan structure of the class described, the combination of a pan including a dough supporting member and an end wall secured thereto, a reinforcing frame attached to the pan and including riser portions at opposite sides of the pan end walls, said riser portions being disposed outside the limits of the pan interior, a pan-connecting strap extending along the exterior of the end wall of the pan, and means mounting the pan upon said strap, comprising a mounting strip having a shank portion in flatwise abutment upon the strap, and fixed thereto, and including an eye surrounding the riser of the frame above the sides of the pan.

5. In a device of the class described, the combination of a plurality of pans each having a bottom and sides of perforate material, and an end wall supporting said bottom and sides, a reinforcing frame for the side and end walls of each pan, said frame including risers extending above the elevation of the side walls of the pan and disposed outside the limits of the end walls thereof, a perforated pan-connecting strap extending along corresponding end walls of the pans, a mounting strip comprising a shank and a pair of loops, one loop at each end of the shank, said loops embracing the adjacent risers of adjacent pans whereby to dispose the mounting strip entirely above the level of the pan sides, and means passing through the perforations of the pan strap and engaging the shank of the mounting strip, for securing the pan to the pan-connecting strap without fixation of the pan end walls thereto.

ELMER H. CHANDONIA.